No. 793,075.

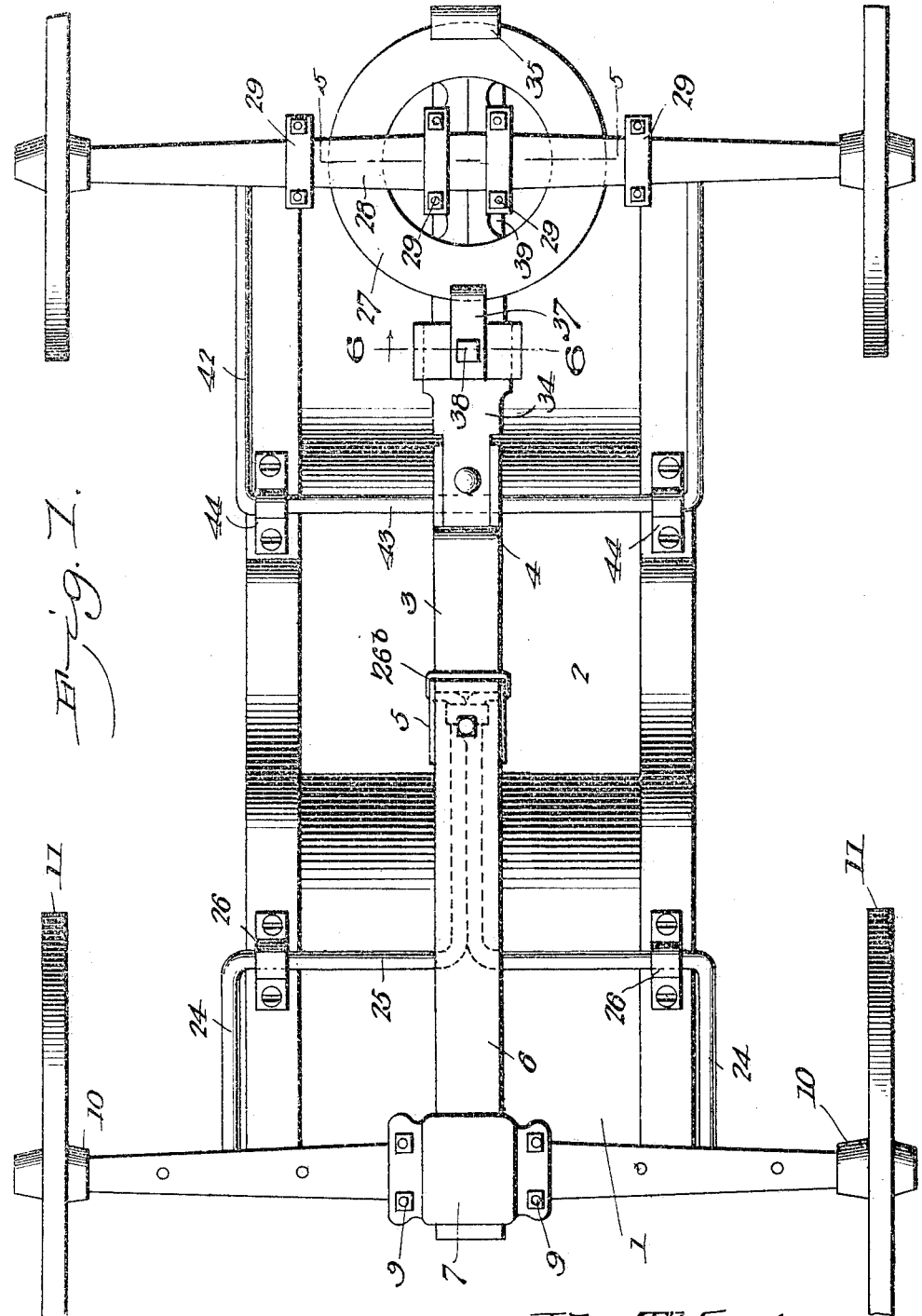

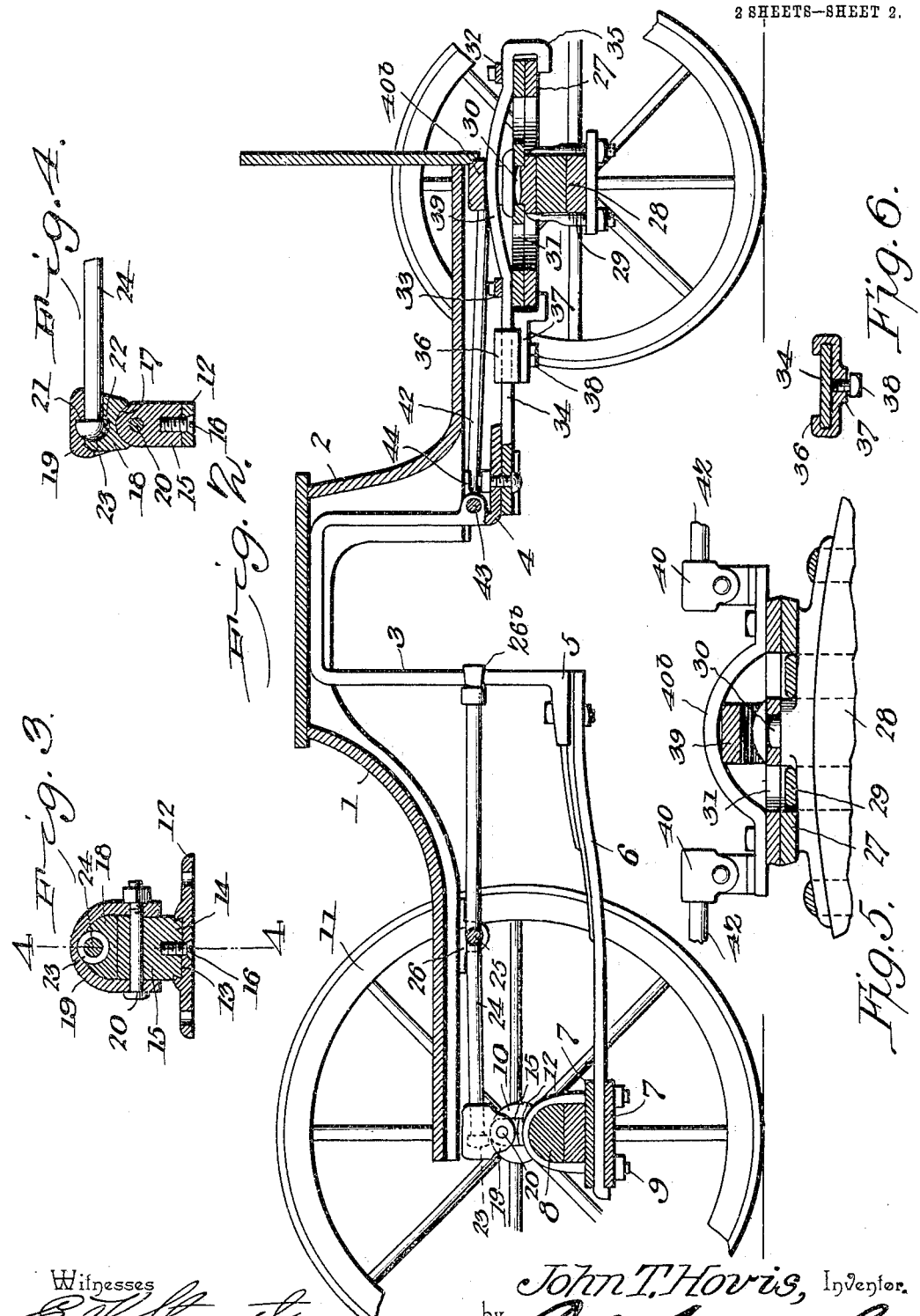

Patented June 27, 1905.

UNITED STATES PATENT OFFICE.

JOHN T. HOVIS, OF CLINTONVILLE, PENNSYLVANIA.

VEHICLE.

SPECIFICATION forming part of Letters Patent No. 793,075, dated June 27, 1905.

Application filed October 21, 1904. Serial No. 229,482.

*To all whom it may concern:*

Be it known that I, JOHN T. HOVIS, a citizen of the United States, residing at Clintonville, in the county of Venango and State of Pennsylvania, have invented a new and useful Vehicle, of which the following is a specification.

My invention relates to vehicles, and more particularly to conveyances having arched bodies; and the object is to provide running-gear having a minimum number of springs for directly supporting the arch of the body.

Another object of the invention is to employ torsion-springs constituting braces which coact with the main springs to prevent the sides of the body from sagging.

A further object is to utilize one of the springs of the vehicle for holding the parts of the fifth-wheel in proper relation.

With the above and other objects in view the invention consists of an arched vehicle-body which is reinforced by an inverted yoke to which are secured the ends of longitudinally-extending springs. One of these springs is secured directly to the rear axle of the vehicle, while the other spring is mounted upon the fifth-wheel and serves to secure together the members thereof. Torsion-springs are connected with the rear axle and fifth-wheel, respectively, and are so connected to the body as to coact with the main springs to prevent the lateral tilting of the vehicle-body.

The invention also consists in the further novel construction and combination of parts hereinafter more fully described, and pointed out in the claims.

In the accompanying drawings I have shown the preferred form of my invention.

In said drawings, Figure 1 is a bottom plan view of the vehicle. Fig. 2 is a central vertical longitudinal section therethrough. Fig. 3 is a transverse section through one of the couplings of the rear brace. Fig. 4 is a section on the line 4 4 of Fig. 3. Fig. 5 is a sectional detail taken on the line 5 5 in Fig. 1. Fig. 6 is a sectional detail taken on the line 6 6 in Fig. 1.

Referring to the figures by numerals of reference, 1 is the body of the vehicle, having an arch 2, to which is fastened an inverted yoke 3, the ends of which are provided with longitudinally-grooved feet 4 and 5, respectively. Bolted or otherwise secured within the groove of foot 5 is a longitudinally-extending spring 6, the rear end of which is clamped between holding-plates 7, which are secured to the center of the rear axle 8 of the vehicle by means of a clip 9. This axle 8 is preferably bowed, and secured upon it adjacent the hubs 10 of the vehicle-wheels 11 are base-plates 12, having dovetail grooves 13 in their upper faces. These grooves receive dovetail extensions 14, formed at the bottom of ears 15, which are rigidly secured in position within the grooves 13 by means of screws 16 or other suitable holding devices. The outer end of each ear 15 is curved, as shown at 17, and fits within and forms a bearing for a block 18. This block is retained in place by a yoke 19, which straddles the ear and is pivoted upon a bolt or pin 20, extending therethrough. The adjoining faces of the yoke and block are recessed, as at 21 and 22, for the reception of a head 23, formed at one end of a Z-shaped torsion-spring 24. Two of these springs are used, their intermediate parts 25 being connected with the under side of the vehicle-body by means of clips 26, while their adjacent ends are firmly connected with each other and with the yoke 3 by means of clips 26<sup>b</sup>.

The lower circle or member 27 of the fifth-wheel of the vehicle is fastened to the forward axle 28 in the ordinary manner, as by means of clips 29, and a centrally-disposed stud 30 extends upward therefrom and forms the pivot of the upper member 31 of the fifth-wheel. A retaining-block 32 is bolted or otherwise secured upon the front portion of member 31, and a similar retaining-block 33 is suitably secured on the member 31 at the rear thereof. Extending between these blocks 32 and 33 and the fifth-wheel member 31 is a spring 34, one end of which is bolted or otherwise fastened within the foot 4 of the yoke 3, while its other end is hooked, as shown at 35, and projects under the lower member 27 of the fifth-wheel, thereby holding the front portions of said members in proper relation. A flanged block or clip 36 is mounted on the spring 34 in rear of the fifth-wheel, and formed upon said clip is a retaining-plate 37, which is held in position by means of the set-screw and which engages under the rear portion of the fifth-wheel. That portion of the spring 34 which is located upon the fifth-wheel is bowed or arched, as shown at 39.

Couplings 40, similar in construction to those used for securing torsion-springs 24, are arranged upon the member 31 of the fifth-wheel at diametrically opposite points, said couplings being connected by an arch-bar $40^b$, and secured within them are the ends of a substantially U-shaped torsion-brace 42, the intermediate portion 43 of which extends through and is adapted to work within straps 44, secured to the body 1.

It will be seen from the foregoing description that by reason of the novel disposition of the springs 6 and 34 and the yoke 3 the arch of the vehicle-body is directly supported by the axles, and therefore injury to said arched portion as a result of undue strain thereon is obviated. Moreover, by the employment of the torsion-springs and braces at the ends of the body the centrally-disposed longitudinally-extending springs will support the body and prevent it from sagging laterally. By projecting spring 34 over the fifth-wheel and shaping it to engage the forward portion thereof the number of parts constituting the running-gear is greatly reduced, and at the same time the members of the fifth-wheel are held in proper relation at all times.

I attach importance to the peculiar construction of the couplings employed for fastening the torsion-springs and braces with the axle and the fifth-wheel of the vehicle. It will be seen that the wear is mostly upon the blocks 18 and the ears 15, which can be readily detached and new ones substituted. To replace the parts of the coupling, it is merely necessary to remove the bolts 20 and the screws 16. The ears 15 can then be slid from the grooves 13 and the yokes 19 raised from blocks 18. New ears and blocks can be quickly substituted and replaced by reversing the above operation.

In the foregoing description I have shown the preferred form of my invention, but I do not limit myself thereto, as I am aware that modifications may be made therein without departing from the spirit or sacrificing the advantages thereof, and I therefore reserve the right to make such changes as clearly fall within the scope of my invention.

Having thus described the invention, what is claimed is—

1. In a running-gear for vehicles, the combination with an arched vehicle-body, of a rigid yoke accommodated within the arch of the body, oppositely-extending springs secured to the ends of the yoke, and means for securing said springs to an axle and the fifth-wheel of a vehicle, respectively.

2. The combination of a pair of axles, a fifth-wheel mounted upon one of said axles, an arched vehicle-body, a rigid yoke seated in the arch of the body, oppositely-extending springs secured to the ends of the yoke, one of said springs being connected to an axle, and means connected with the other spring for holding the members of the fifth-wheel in proper relation.

3. The combination of an arched vehicle-body, a body-supporting yoke seated in the arch of the body, and springs connecting said yoke with the axles.

4. In a running-gear for vehicles, the combination with axles, and a fifth-wheel secured upon one of the axles, of a rigid yoke, oppositely-projecting springs secured to the yoke and to the fifth-wheel and one of the axles, respectively, and means connected to the fifth-wheel and one of the axles for preventing lateral sagging of a vehicle-body upon the gear.

5. The combination with a vehicle-body, of a rigid yoke secured thereto, a front and a rear axle, a fifth-wheel, centrally-disposed oppositely-extending springs secured to the yoke and to the fifth-wheel and rear axle, respectively, and means connected to the body and said wheel and axle for preventing the body from sagging laterally.

6. The combination with an arched vehicle-body, axles and a fifth-wheel; of a rigid yoke secured within the arch of the body, centrally-disposed oppositely-extending springs secured to the yoke and to the fifth-wheel and rear axle, respectively, means upon one of the springs for holding the fifth-wheel together, and torsion-springs for supporting the body against lateral tilting.

7. The combination with an arched vehicle-body, axles, and a fifth-wheel, of a rigid yoke secured within the arch of the body, resilient supports connecting the yoke with the rear axle and fifth-wheel, torsion-springs connecting the body with said axle and wheel, and pivoted wear-blocks detachably supporting the ends of said torsion-springs.

8. The combination with a spring-supported vehicle-body and axles therefor, of detachable members mounted upon the axles, a wear-block slidably bearing upon each of said members, torsion-springs connected with the body, and means for securing the ends of said springs upon the wear-blocks.

9. In a running-gear for vehicles, the combination with the axles, and a fifth-wheel mounted upon the front axle, of a rigid yoke, a spring connecting said yoke with the rear axle, a hooked spring extending from the yoke and secured upon the fifth-wheel, the hook of said spring overlapping and engaging one portion of the fifth-wheel, and a retaining-plate detachably secured upon the spring and engaging the opposite portion of said wheel.

10. The combination with an arched vehicle-body, of a centrally-disposed longitudinal body-supporting spring device including a rigid body-supporting yoke engaging the arch of the vehicle-body, and spring members connected with and extending from said yoke and supported upon the axles.

In testimony that I claim the foregoing as my own I have hereto affixed my signature in the presence of two witnesses.

JOHN T. HOVIS.

Witnesses:
S. E. McKee,
M. L. McKee.